United States Patent
McCalmont et al.

(10) Patent No.: US 12,375,024 B2
(45) Date of Patent: Jul. 29, 2025

(54) SOLAR CANOPY SYSTEMS AND METHODS

(71) Applicant: Paired Power, Inc., Campbell, CA (US)

(72) Inventors: David Thompson McCalmont, Palo Alto, CA (US); Andrew Ontak Wong, San Jose, CA (US); Jacob Michael Rendina, Santa Clara, CA (US); Jonathan Scott McCalmont, San Jose, CA (US); Aaron William McCalmont, Santa Clara, CA (US); Joshua R. Mehrer, Sacramento, CA (US)

(73) Assignee: Paired Power, Inc., Campbell, CA (US)

( * ) Notice: Subject to any disclaimer, the term of this patent is extended or adjusted under 35 U.S.C. 154(b) by 161 days.

(21) Appl. No.: 17/819,499

(22) Filed: Aug. 12, 2022

(65) Prior Publication Data

US 2023/0208345 A1     Jun. 29, 2023

Related U.S. Application Data

(60) Provisional application No. 63/293,582, filed on Dec. 23, 2021.

(51) Int. Cl.
| | | |
|---|---|---|
| *H02S 20/23* | (2014.01) | |
| *B60L 8/00* | (2006.01) | |
| *B60L 53/51* | (2019.01) | |
| *H02J 7/35* | (2006.01) | |
| *H02S 20/30* | (2014.01) | |
| *A47B 3/02* | (2006.01) | |

(52) U.S. Cl.
CPC .............. *H02S 20/23* (2014.12); *B60L 8/003* (2013.01); *B60L 53/51* (2019.02); *H02J 7/35* (2013.01); *H02S 20/30* (2014.12); *A47B 3/02* (2013.01)

(58) Field of Classification Search
CPC .......... H02S 20/23; H02S 20/30; B60L 8/003; B60L 53/51; H02J 7/35; A47B 3/02; E04H 6/025
See application file for complete search history.

(56) References Cited

U.S. PATENT DOCUMENTS

| | | | |
|---|---|---|---|
| 4,349,733 | A | 9/1982 | Foletta |
| 7,705,277 | B2 | 4/2010 | Noble et al. |
| 9,917,471 | B2 | 3/2018 | Wheatley et al. |
| 10,020,772 | B1 * | 7/2018 | Puri ................ H02S 10/40 |
| D827,241 | S | 8/2018 | Kritzer et al. |
| 11,192,763 | B2 | 12/2021 | Kritzer et al. |
| 2009/0050194 | A1 | 2/2009 | Noble et al. |

(Continued)

FOREIGN PATENT DOCUMENTS

| | | |
|---|---|---|
| EP | 2883265 B1 | 2/2019 |
| WO | 2021246993 A1 | 12/2021 |

OTHER PUBLICATIONS

International Search Report and Written Report received in International Application No. PCT/US22/81767, mailed on Mar. 30, 2023, 6 pages.

*Primary Examiner* — Patrick J Maestri

(57) ABSTRACT

Example electric solar canopy systems and methods are described. In one implementation, a foundation is positioned on a surface. A table is configured to secure multiple solar panels. A lifting mechanism is coupled to the foundation and the table, where the lifting mechanism is configured to move the table between a lowered position and a raised position.

5 Claims, 20 Drawing Sheets

(56) References Cited

U.S. PATENT DOCUMENTS

| | | |
|---|---|---|
| 2009/0229200 A1 | 9/2009 | Noble et al. |
| 2011/0132353 A1 | 6/2011 | Gumm et al. |
| 2017/0021735 A1 | 1/2017 | Wheatley et al. |
| 2020/0144824 A1 | 5/2020 | Campus et al. |

* cited by examiner

SOLAR CANOPY SYSTEMS AND METHODS

CROSS REFERENCE TO RELATED APPLICATIONS

This application claims the benefit of U.S. Provisional Application Ser. No. 63/293,582, entitled "Solar Canopy," filed Dec. 23, 2021, the disclosure of which is incorporated herein by reference in its entirety.

TECHNICAL FIELD

The present disclosure relates to solar power systems and methods that provide simple installation of, for example, solar canopies that may be used as power sources for charging electric vehicles or other electric devices, providing temporary or emergency power, or connecting to and delivering energy to the electric utility grid.

BACKGROUND

With the increasing number of electric vehicles being produced and driven, it is important to provide more electric vehicle charging stations that are convenient for owners and drivers of electric vehicles. Providing various types of charging stations in multiple distributed locations will support the growing number of electric vehicles used on a daily basis.

Some retail locations and commercial campuses provide limited parking spaces with electric vehicle charging connections. Providing electric power to parking spaces for the purpose of charging electric vehicles typically requires installing electric power lines across part of the parking area. This installation of power lines can be costly, especially when the source of the electric power is a significant distance from the parking area. Additionally, the interconnection of those charging stations to the utility grid can be complex and costly. Some charging stations use a significant amount of power, which may not be readily available through the electric service capacity of existing buildings.

In some situations, solar panels may be used in a canopy or other structure to generate power for charging electric vehicles or other electric devices. In existing systems, the canopy containing the solar panels may be installed using a structure that is permanently attached to the ground and typically requires the use of cranes, front-end loaders, pile drivers, concrete mixers, or other large or heavy equipment to install the structure at the desired location. These permanently mounted systems are expensive and time-consuming to install. Additionally, these types of mounting systems typically require large equipment (e.g., bucket trucks, boom trucks, lifts, or cranes) to service and maintain the permanently installed structure.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 10A-11C depict perspective views of an embodiment of a solar canopy being moved from a lower height to an upper height.

FIGS. 11A-11H depict perspective views of an embodiment of a solar canopy being assembled.

DETAILED DESCRIPTION

Figure 1:
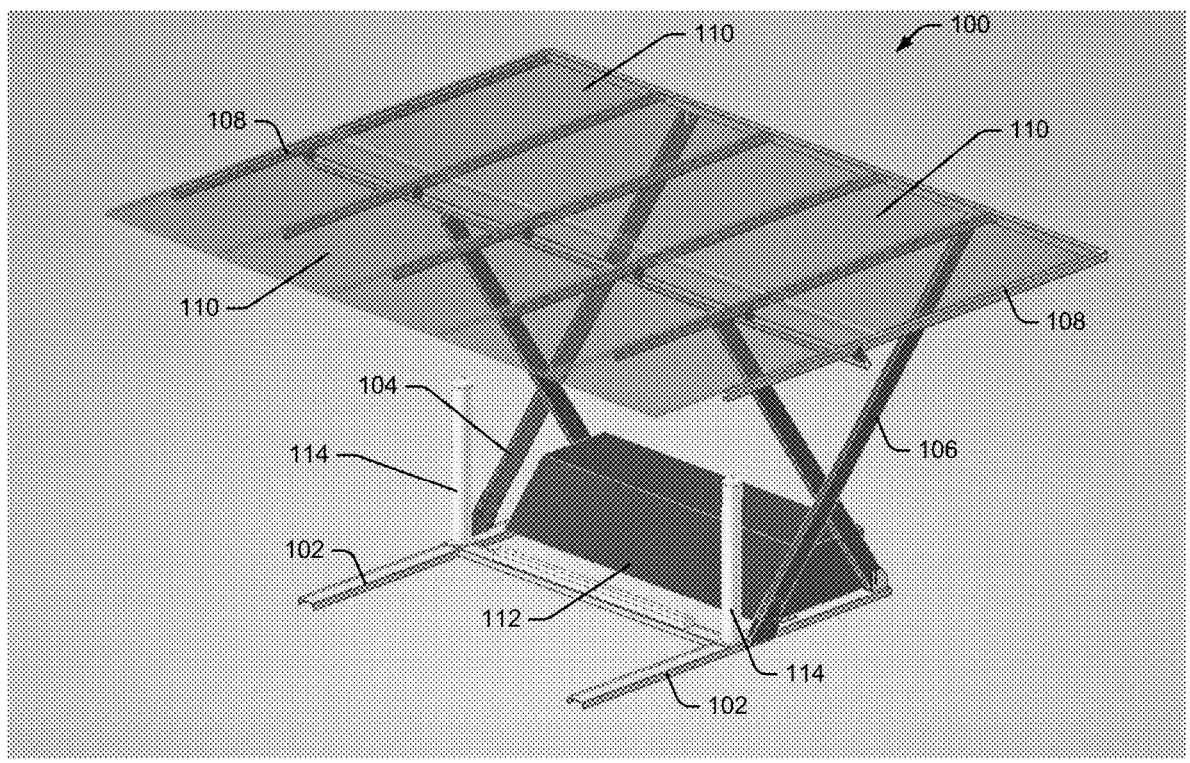
FIG. 1 depicts a perspective view of an embodiment of a solar canopy.

The solar canopy systems and methods described herein provide a portable and easy-to-install structure that includes multiple solar panels to receive sunlight and convert the sunlight into electrical energy. That electrical energy may be used, for example, to charge an electric vehicle, charge a battery, charge another electric device, or provide electrical energy to a utility grid. As discussed herein, the solar canopy systems and methods may include an adjustable structure that has a variable height, such as a lower height that allows for easy assembly of the structure and an upper height that allows a vehicle to drive under the solar canopy or provides overhead shade for activities being conducted under the solar canopy. The system is designed to allow one or two users to install the solar canopy system while standing on the ground without requiring large equipment (e.g., bucket trucks, boom trucks, lifts, or cranes). For example, the one or two users may be installers, assemblers, maintenance workers, construction workers, or repair workers. If maintenance, service, or repair is needed for the solar canopy system, the adjustable structure can be lowered to the lower height, which allows one or more users to work on the solar canopy system while standing on the ground (e.g., avoiding the need for large equipment). Additionally, the described systems and methods provide shade for the vehicle parked under the solar canopy (or any other person, device, or activity located under the solar canopy) and generate power that can be used to recharge the vehicle or other device associated with or proximate to the solar canopy. In some embodiments, the solar canopy is positioned on a ground surface that may be a substantially planar ground surface, an irregular ground surface, a paved surface, a dirt surface, an unimproved surface, or a liquid surface.

In the following description, reference is made to the accompanying drawings that form a part thereof, and in which are shown by way of illustration specific exemplary embodiments in which the disclosure may be practiced.

These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, system, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flow diagram and/or block diagram block or blocks.

The systems and methods described herein support the charging of one or more electric vehicles or other devices. In some embodiments, the systems and methods can charge multiple electric vehicles or devices simultaneously using one or more arrays of solar cells, photovoltaic modules, and the like. As used herein, "solar cells" refers to any photovoltaic module or other mechanism that converts solar energy into an electrical signal. As described herein, certain implementations can charge one or more electric vehicles or devices directly from the solar cells without the need for an intermediate battery to store the energy collected from the solar cells.

The systems and methods described herein support the charging of one or more electric vehicles or other devices using solar cells. The use of solar cells allows charging locations to be created without the need for a connection to a traditional power grid. This simplifies creation of the charging locations and avoids problems caused by fully utilized electrical panels, service connections, and other electrical circuits. For example, the interconnection of charging stations to the utility grid can be complex and costly. Some charging stations use a significant amount of power, which may not be readily available through the electric service capacity of existing buildings located near a particular charging station. These systems and methods eliminate the time and expense required to create buried or overhead connections for power lines connected to the power grid.

Some embodiments may include a connection to the power grid in addition to solar cells and other power sources. For example, certain embodiments can avoid the occurrence of electricity demand charges and other costs of grid-only systems. When demand charges are high, the system can access power from solar cells or other power sources. When grid-based power is less expensive, or when solar power is not available (e.g., at night), the system may access power from the grid.

Charging locations, as discussed herein, can be located anywhere, but are particularly useful in areas where drivers park their electric vehicles for a period of time, such as a corporate campus, shopping center, retail store, school, convention center, sports arena, apartment building, park, beach, residential location, and the like. As adoption of electric vehicles grows and becomes more prevalent, the demand for charging locations that provide a charge over an extended period of time, such as workplace charging, will increase. In these types of locations, drivers of electric vehicles can enjoy the convenience of charging their vehicle while working, shopping, attending school, or performing other activities. Providing these charging locations is beneficial to, for example, business owners and employers who want to provide charging stations for drivers and/or employees without incurring costly installations requiring access to the power grid. The described systems and methods are also beneficial to electric vehicle owners who want a cost-effective and easy-to-install charging system at their home or other location. Additionally, as demand grows for EV charging in locations that are distant from the electric power grid (or lack adequate power from the power grid), the described systems and methods will become more desirable.

With the increasing number of electric vehicles being produced and driven, it is important to provide more electric vehicle charging stations that are convenient for owners and drivers of electric vehicles. Providing various types of charging stations in multiple distributed locations will support the growing number of electric vehicles used on a daily basis.

The solar canopy systems and methods described herein provide a portable and easy-to-install structure that includes multiple solar panels that receive sunlight and convert the sunlight into electrical energy. That electrical energy may be used, for example, to charge an electric vehicle, charge a battery, charge another electric device, or provide electrical energy to a utility grid. As discussed herein, the solar canopy systems and methods may include an adjustable structure that has a variable height, such as a lower height that allows for easy assembly of the structure and an upper height that allows a vehicle to drive or park under the solar canopy. The described systems and methods provide shade for the vehicle parked under the solar canopy and generate electrical energy that can be used to recharge the vehicle parked under the solar canopy.

The systems and methods described herein solve the problems currently associated with installing solar canopies, such as significant time required to install, expensive to install, heavy equipment (cranes, bucket trucks, etc.) needed for installation, and the like. The quick and less complex installation process of the solar canopy described herein avoids blocking parking areas and parking lots for significant amounts of time when installing traditional canopies with EV chargers. The fast and easy installation of the solar canopy systems and methods described herein create minimal disruption of parking areas and parking lots. Further, the installation can be accomplished with one or two human users standing on the ground, without the need for expensive and heavy equipment used in traditional solar canopy installations.

FIG. 1 depicts a perspective view of an embodiment of a solar canopy 100. As shown in FIG. 1, solar canopy 100 includes a foundation 102 that may contain multiple components that support the remainder of solar canopy 100. For example, foundation 102 may include multiple support pieces that contact a surface on which solar canopy 100 is positioned. The support pieces can be made of metal or any other suitable material. In some embodiments, foundation 102 may include a ballast or other heavy material to help secure solar canopy 100 in a particular location. In some implementations, a battery may be used as a ballast that rests upon, or is secured to, other support pieces of foundation 102. In other embodiments, foundation 102 may be secured to the surface using, for example, ground screws.

Two lifting mechanisms 104 and 106 are attached to foundation 102. In the example of FIG. 1, lifting mechanisms 104 and 106 work together to raise and lower a table 108 attached to lifting mechanisms 104 and 106. In some embodiments, lifting mechanisms 104 and 106 are scissor mechanisms that raise 108 as the bottom portions of lifting mechanisms 104 and 106 are moved towards one another and that lower 108 as the bottom portions of lifting mechanisms 104 and 106 move away from one another. In other embodiments, any type of lifting mechanism can be used to raise and lower table 108.

Table 108 provides a structure to support multiple solar panels 110. In the example of FIG. 1, table 108 can support ten solar panels 110. Other embodiments may support any number of solar panels 110 in any configuration. In some embodiments, solar panels 110 generate power based on light received on a top surface (e.g., the surface opposite foundation 102) of each solar panel 110. In other embodiments, solar panels 110 may generate power based on light received on a top surface and a bottom surface of each solar panel 110. These types of solar panels may be referred to as bifacial solar panels. The power generated by solar panels 110 may be used to charge an electric vehicle, charge an electric device, charge a battery, operate a device, and the like. As discussed herein, in some embodiments table 108 is constructed to prevent the structure from blocking the bottom surface of solar panels 110, thereby providing a higher energy yield from bifacial solar panels.

As shown in FIG. 1, solar canopy 100 may include one or more batteries 112. In some embodiments, batteries 112 may store power generated by solar panels 110. The power stored in batteries 112 may be used to charge an electric vehicle, charge an electric device, charge a battery, operate a device, and the like.

In some embodiments, solar canopy 100 is designed for a vehicle to park under table 108. In this situation, solar canopy 100 provides shade for the vehicle while generating power simultaneously. As discussed above, the power generated by solar panels 110 may charge the vehicle, batteries 112, or any other device. Solar canopy 100 may further include one or more bumpers or bollards 114 that prevent a vehicle from accidentally driving into lifting mechanisms 104 and 106, batteries 112, or any other part of solar canopy 100.

Figure 2:
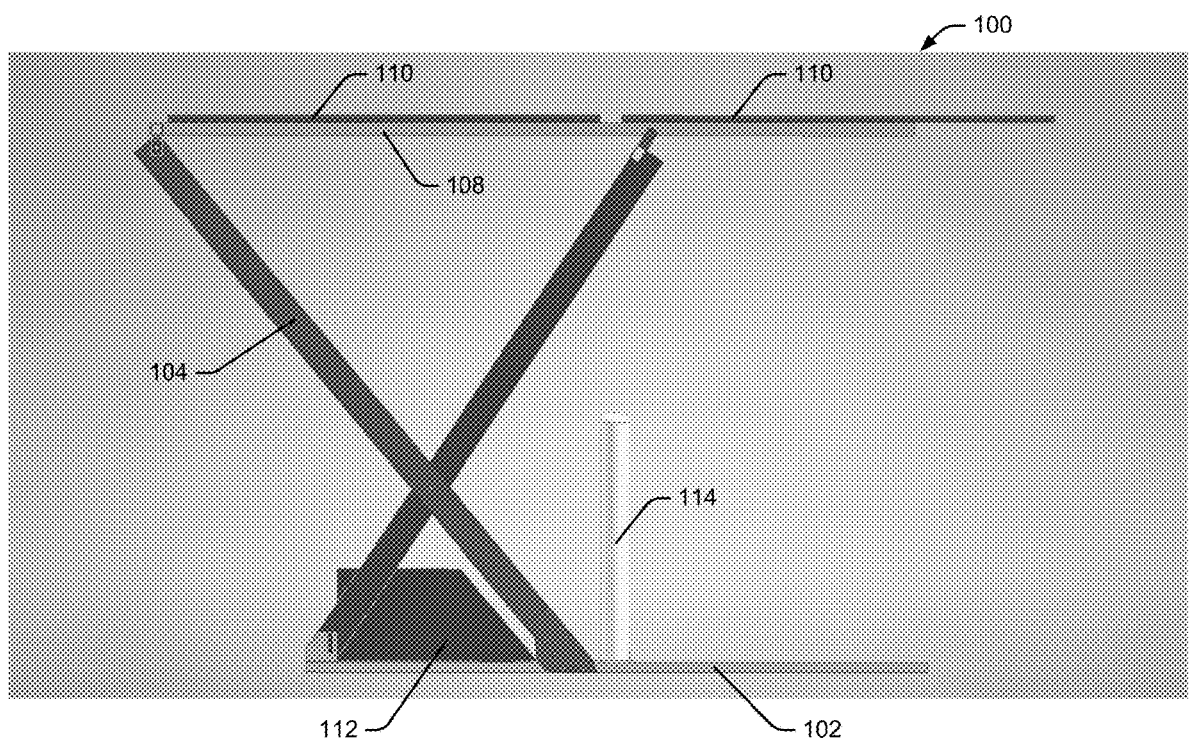
FIG. 2 depicts a side view of an embodiment of a solar canopy.

FIG. 2 depicts a side view of an embodiment of solar canopy 100. As shown in FIG. 2, foundation 102 supports lifting mechanism 104, table 108, and solar panels 110. The example of FIG. 2 shows solar canopy 100 in a raised position, which is the normal operating position. This raised position allows a vehicle to drive under table 108 and solar panels 110. Additionally, other devices or systems may be located under table 108 and solar panels 110.

In the example of FIG. 2, table 108 and solar panels 110 are substantially horizontal. In other embodiments, table 108 and solar panels 110 may be tilted forward or backward such that table 108 and solar panels 110 are not horizontal. This tilting of table 108 and solar panels 110 may allow solar panels 110 to capture more light and generate more power if solar panels 110 are tilted toward the primary sunlight direction. The tilting of table 108 and solar panels 110 also simplifies the cleaning of solar panels 110. If dust, dirt, leaves, and other materials are deposited on the top surface of solar panels 110, those materials may block sunlight from reaching solar panels 110, thereby reducing the power generated by solar panels 110. The tilting of table 108 allows rain to naturally wash off dust, dirt, leaves, and other materials by running off the tilted surface. Additionally, the tilted table 108 can be easily washed with a hose or other water source to wash off dust, dirt, leaves, and other materials on the top of solar panels 110.

Figure 3:
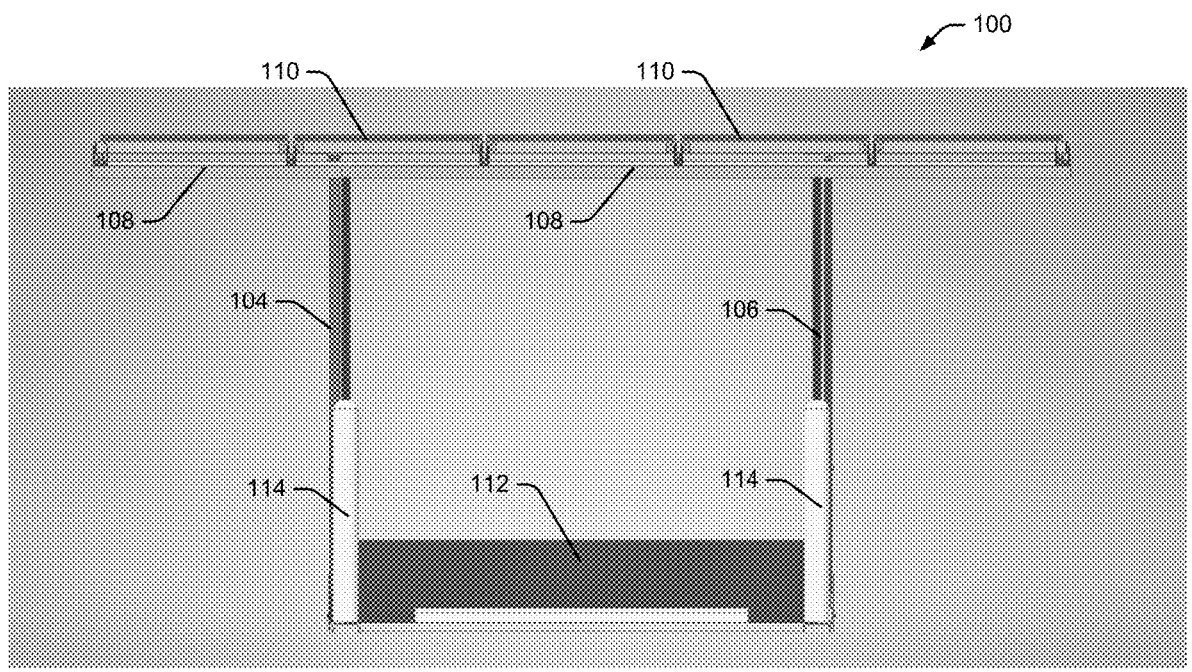
FIG. 3 depicts a front view of an embodiment of a solar canopy.

FIG. 3 depicts a front view of an embodiment of solar canopy 100. The front view shown in FIG. 3 is an example of the view a driver of a vehicle would see when driving their vehicle under solar canopy 100.

Figure 4:
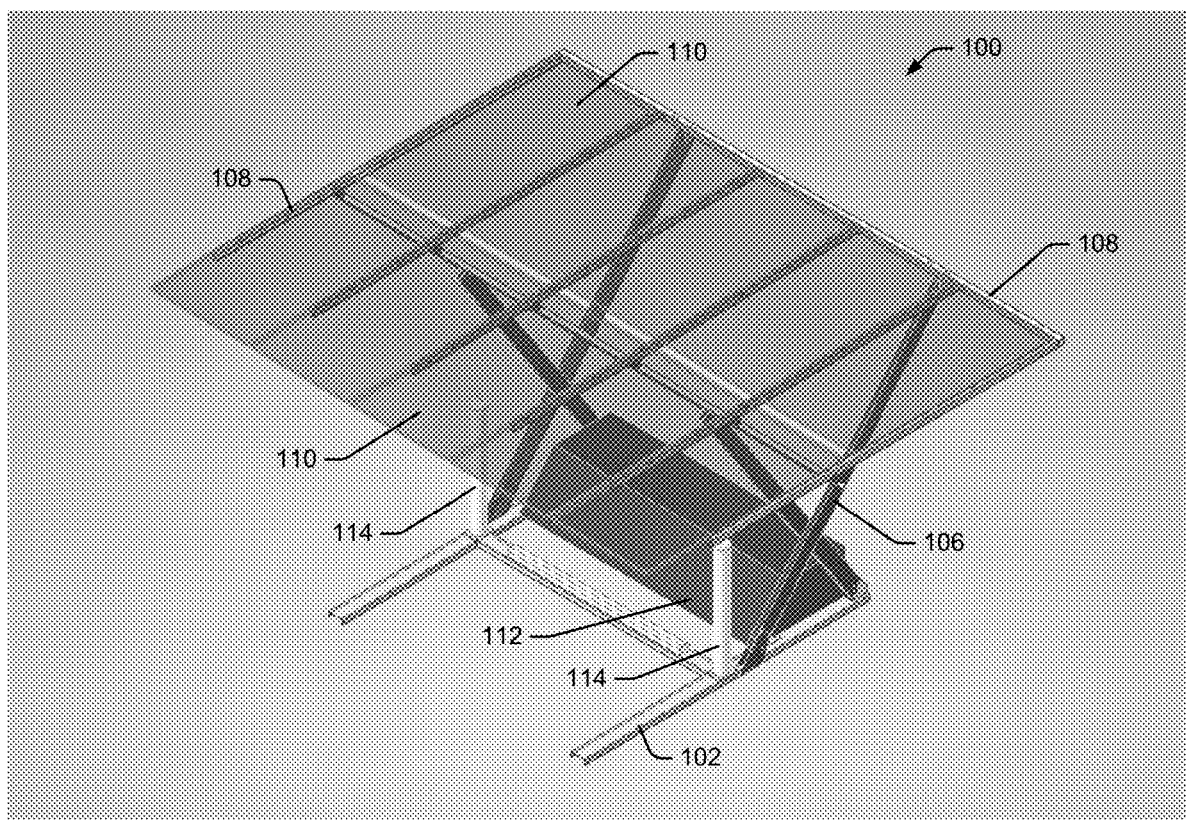
FIG. 4 depicts a top perspective view of an embodiment of a solar canopy.

FIG. 4 depicts a top perspective view of an embodiment of solar canopy 100. In the example of FIG. 4, the top surface of 10 solar panels 110 are shown mounted in table 108.

Figure 5:
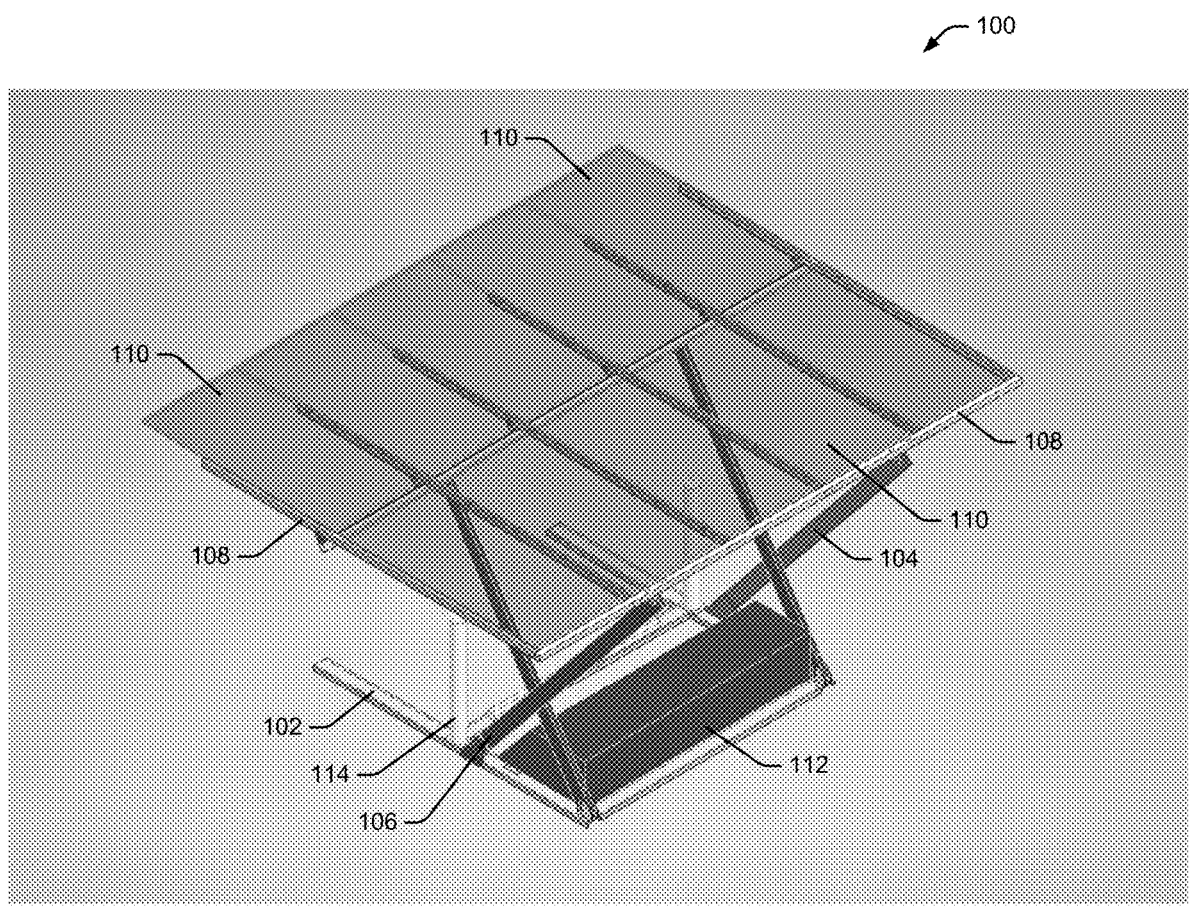
FIG. 5 depicts another top perspective view of an embodiment of a solar canopy.

FIG. 5 depicts another top perspective view of an embodiment of solar canopy 100. In the example of FIG. 5, a different view of the top surface of 10 solar panels 110 are shown mounted in table 108.

Figure 6:
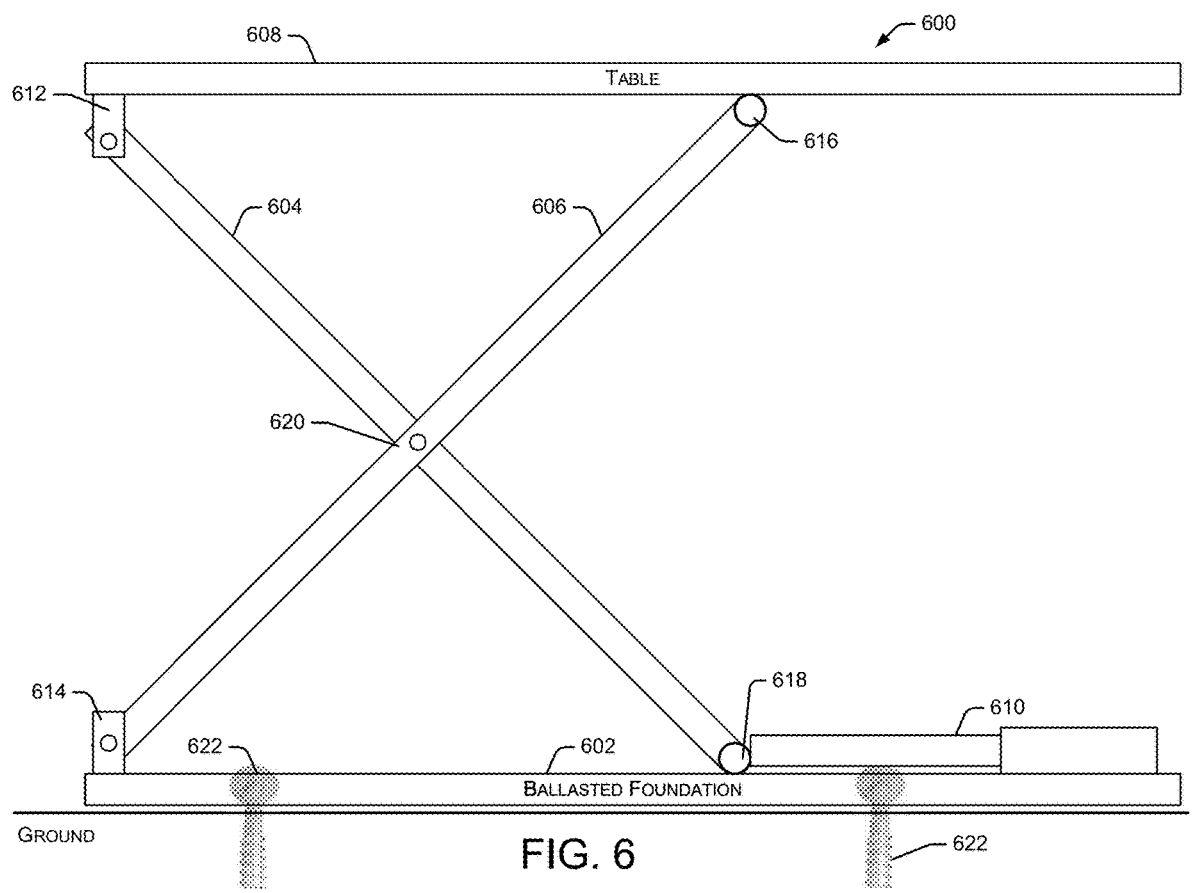
FIG. 6 depicts a side view of an embodiment of a solar canopy.

FIG. 6 depicts a side view of an embodiment of a solar canopy 600. As shown in FIG. 6, solar canopy 600 sits on the ground, which may include any type of surface, such as concrete, asphalt, gravel, dirt, and the like. In some embodiments, the ground is substantially level to accommodate installation of solar canopy 600. In the example of FIG. 6, solar canopy 600 includes a ballasted foundation 602. In various embodiments, a variety of items may be used as the ballast in foundation 602, such as paver bricks, batteries, bladders (expandable and portable containers that can be filled with water, sand, dirt, or any other item), or any other object that provides weight to hold ballasted foundation 602 in a desired position. These items may be located in a frame associated with ballasted foundation 602 or any other structure associated with ballasted foundation 602. The weight of the items located in ballasted foundation 602 provide stability for the base of solar canopy 600. In some examples, ballasted foundation 602 is free-standing (e.g., not secured to the ground). A free-standing configuration simplifies the installation process and may not require building permits or other installation permits or approvals since solar canopy 600 is not permanently mounted to the ground or other structure.

In other examples, ballasted foundation 602 is secured to the ground using any type of mounting mechanism or attachment mechanism 622, such as ground screws, to provide a more secure attachment of solar canopy 600 to the ground. In some implementations, at least a portion of ballasted foundation 602 may be positioned within the ground surface such that the top of ballasted foundation 602 is approximately flush with the surface of the ground. For example, the portion of ballasted foundation 602 may be set within the concrete or asphalt surface. Alternatively, the portion of ballasted foundation 602 may be set within a channel or groove created in the concrete or asphalt surface. In some implementations, ballasted foundation 602 may be set on a paved surface of a parking garage or other parking area. Similarly, the channel or groove may be set within the paved surface of a parking garage or other parking area.

The example solar canopy shown in FIG. 6 includes two supports 604 and 606 arranged in a crossing configuration. Two sets of supports 604, 606 are provided on opposite sides of solar canopy 600. Supports 604 and 606 provide structural support to a table 608 that forms the top of solar canopy 600. As discussed herein, multiple solar panels are attached to table 608 to receive sunlight and generate electricity that may be used to charge an electric vehicle, a battery, or any other electric device. In some embodiments, the multiple solar panels are arranged as one or more PV (photovoltaic) strings of panels wired electrically in series.

As illustrated in FIG. 6, support 604 has a fixed connection 612 with table 608, which allows support 604 to pivot around fixed connection 612. Similarly, support 606 has a fixed connection 614 with ballasted foundation 602, which allows support 606 to pivot around fixed connection 614. Supports 604 and 606 are connected to one another at a pivot point 620. Support 604 has one or more wheels 618 (or slides) at one end that is movable along a top surface of ballasted foundation 602. For example, support 604 may slide along a rail that forms a part of ballasted foundation 602. Support 606 has one or more wheels 616 (or slides) fixed to one end that is movable along one or more beams or portions of the bottom surface of table 608. For example, support 606 may slide along an edge of a frame that forms a part of table 608. In alternate embodiments, other mechanisms may be used to allow support 604 to move along ballasted foundation 602 and allow support 606 to move along table 608.

The configuration of supports 604 and 606 shown in FIG. 6 represents one possible embodiment of a support structure. In alternate embodiments, any type of support structure may be used that allows table 608 to be raised and lowered, as discussed herein. In the example of FIG. 6, table 608 may be raised and lowered by moving supports 604 and 606, allowing wheels 616 and 618 to roll along foundation 602 and table 608. For example, moving wheels 616 and 618 closer to fixed connections 612 and 614 causes table 608 to be raised. Conversely, moving wheels 616 and 618 away from fixed connections 612 and 614 causes table 608 to be lowered. In other embodiments, any mechanism with one or more components may be used to support table 608 and allow for raising and lowering table 608 with respect to the ballasted foundation.

In some embodiments, a mechanical lifter 610, such as a piston or other lifting mechanism is used to move wheel 618 along ballasted foundation 602 from right to left, thereby raising table 608. Additionally, mechanical lifter 610 may move wheel 618 along ballasted foundation 602 from left to right, thereby lowering table 608. Mechanical lifter 610 may be any type of mechanical, hydraulic, pneumatic, helical screw, piston, or other lifting device capable of moving wheel 618. In other embodiments, any type of moving mechanism may be used to raise and lower table 608. These embodiments may include, for example, the use of hoist mechanisms, screws, gears, levers, winches, cables, pulleys, guide tracks, hydraulic lifts, and the like.

It will be appreciated that the embodiment of FIG. 6 is given by way of example only. Other embodiments may include fewer or additional components without departing from the scope of the disclosure. Additionally, illustrated components may be combined or included within other components without limitation.

Figure 7:
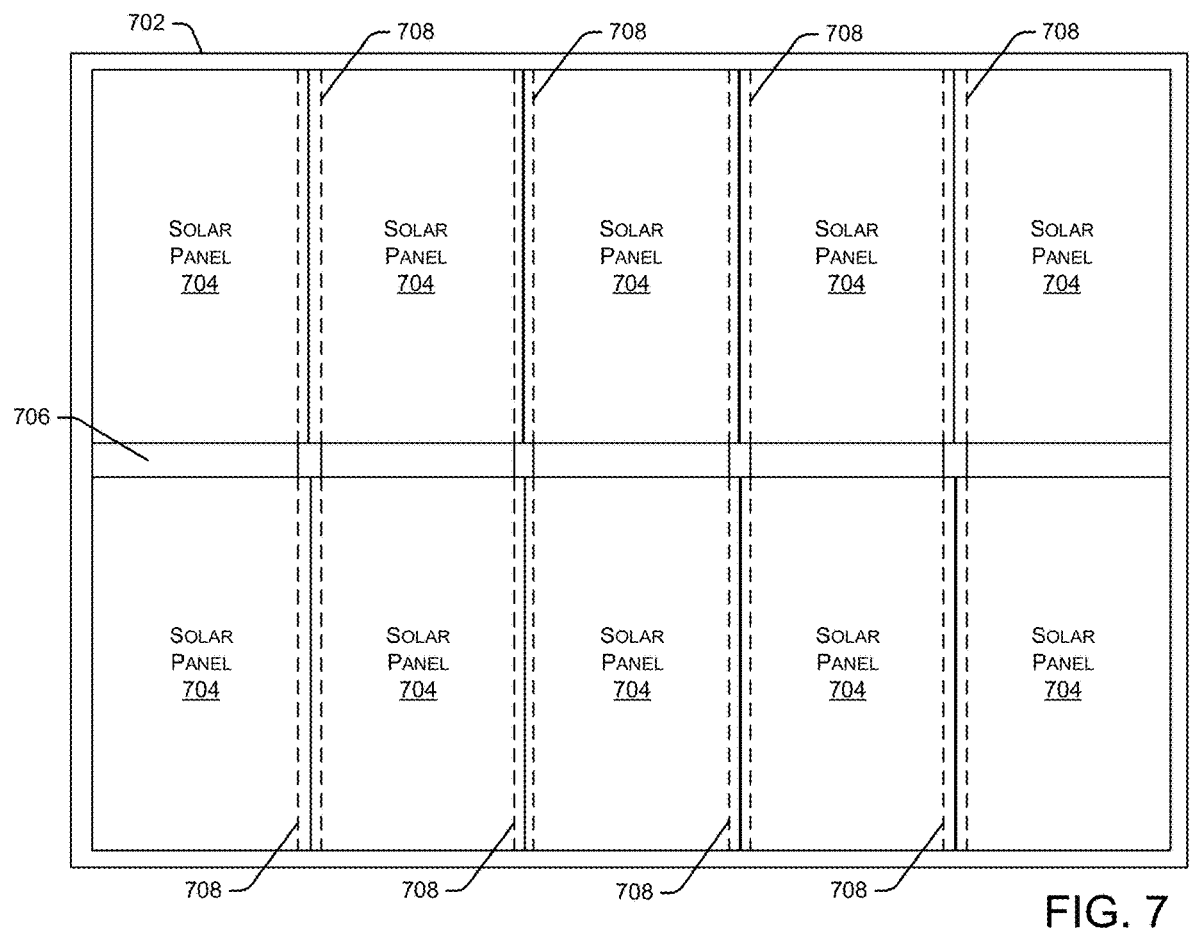
FIG. 7 depicts a top view of an embodiment of a solar canopy showing multiple solar panels and associated support structures.

FIG. 7 depicts a top view of an embodiment of a solar canopy showing multiple solar panels and associated support structures. In some embodiments, FIG. 7 shows at least a portion of table 108 discussed above with respect to FIG. 1. As shown in FIG. 7, a frame 702 surrounds the perimeter of the solar canopy/table. In this example, 10 solar panels 704 are arranged in two different rows with five solar panels in each row. For example, each row of five solar panels 704 may represent a PV string. In other embodiments, any number of solar panels 704 may be configured into a PV string. In some implementations, the output voltage from a string of solar panels 704 is 350 VDC to 450 VDC, which is appropriate for charging an electric vehicle. In some embodiments, the size of a string of solar panels can be chosen to generate an appropriate voltage for charging a particular EV, for charging a stationary battery, or for delivering power to an inverter or other system.

In a particular embodiment, ten solar panels 704 may be configured as five PV strings with two solar panels 704 associated with each string. In this embodiment, each PV string would generate 60 VDC to 70 VDC, which is an appropriate charging voltage for 48V stationary batteries.

As shown in FIG. 7, a gap 706 is located between the two rows of solar panels 704. Gap 706 allows for wire management such that the wires, connectors, and other wire management components do not block light from reaching the top or bottom surfaces of solar panels 704. Additionally, gap 706 aligns with the final location of the lifting mechanism in the raised position. Thus, when in the raised position, the lifting mechanism does not block light from reaching the bottom surface of solar panels 704.

Broken lines 708 in FIG. 7 represent intermediate supports that extend between opposite sides of frame 702 and support the edges of the multiple solar panels 704. These intermediate supports are configured to support the multiple solar panels 704 without blocking light from reaching the bottom surface of the multiple solar panels 704. This configuration is important when using bifacial solar panels that are capable of receiving light on both the top and bottom surfaces of the solar panel. Thus, the configuration of the intermediate supports 708 maximizes the amount of reflected light received by solar panels 704 on the bottom surface of each panel. The embodiments discussed herein represent improvements over existing systems that construct solar canopies in which the support structures of the canopy block and create shadows that prevent (or reduce) the capture of reflected light by the bottom surface of the panels. Thus, the support structures of these existing systems may prevent up to a 15% additional energy gain by failing to take full advantage of bifacial solar panels.

Figure 8:
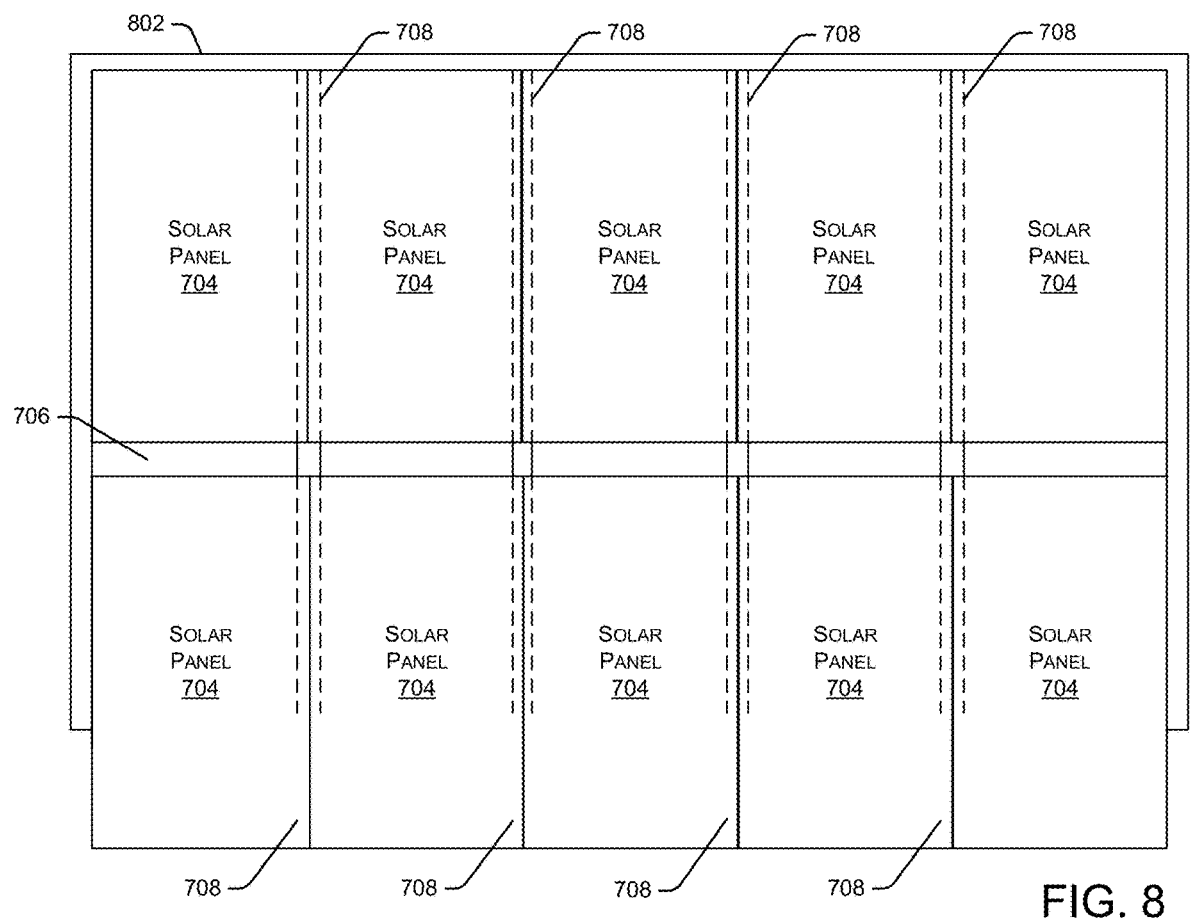
FIG. 8 depicts a top view of another embodiment of a solar canopy showing multiple solar panels and associated support structures.

FIG. 8 depicts a top view of another embodiment of solar canopy 700 showing multiple solar panels and associated support structures. In the example of FIG. 8, a frame 802 surrounds a smaller portion of the perimeter of the solar canopy/table than the frame 702 shown in FIG. 7. For example, the lower five solar panels 704 shown in FIG. 8 partially extend past frame 802. Using a smaller frame 802 with less material (as compared to frame 702), lightens the weight of the table. Additionally, the intermediate supports 708 are shorter for the five lower solar panels 704 due to the smaller frame 802

Figure 9:
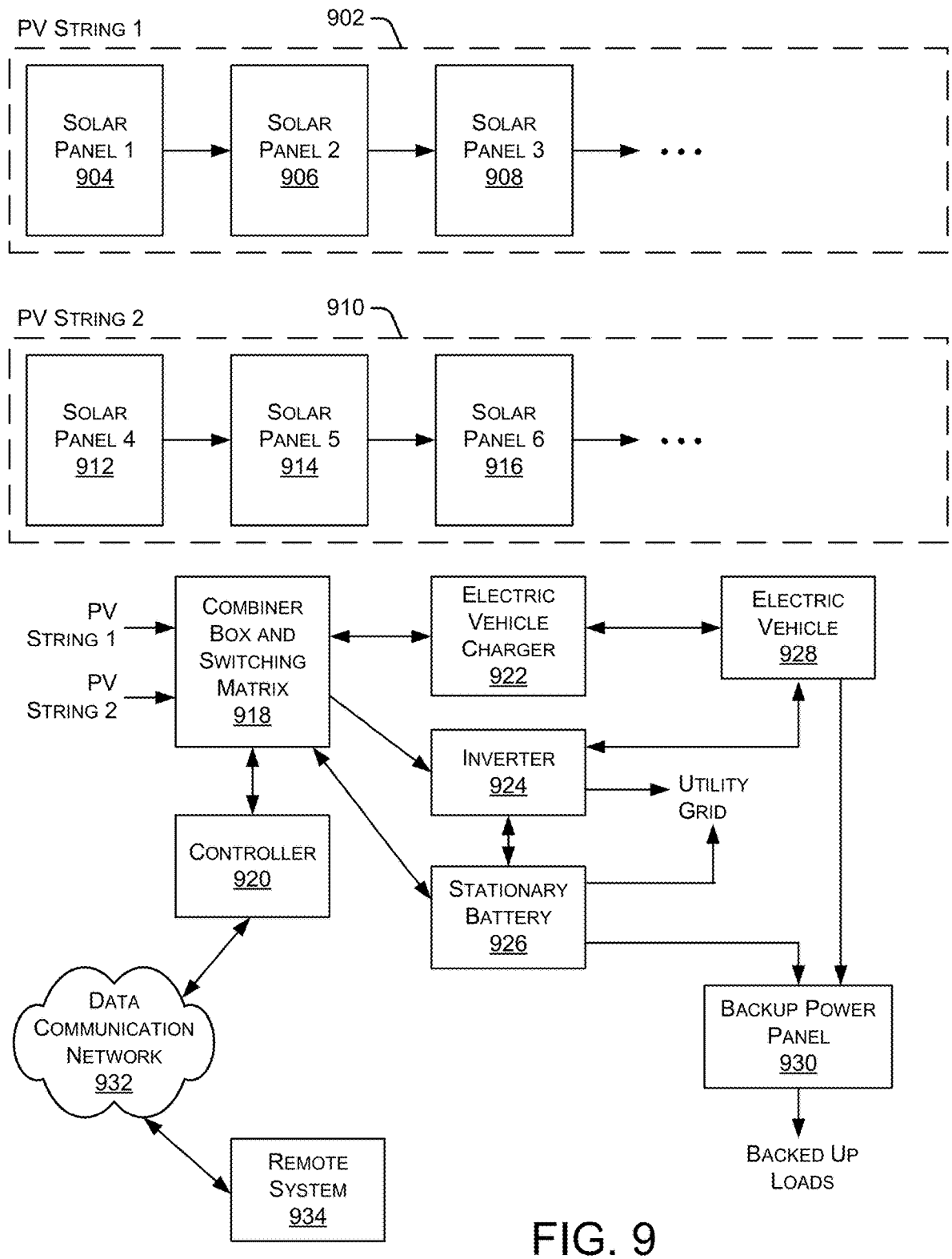
FIG. 9 is a block diagram depicting an embodiment of various components of an embodiment of a solar canopy.

FIG. 9 is a block diagram depicting an embodiment of various components of an embodiment of a solar canopy. As shown in FIG. 9, a first PV string 902 contains any number of solar panels 904-908. Similarly, a second PV string 910 contains any number of solar panels 912-916. The outputs of the two PV strings 902 and 910 are provided to a combiner box and switching matrix 918. Combiner box and switching matrix 918 receives power from the PV strings 902, 910 and provides a flexible mechanism for delivering the power to various systems, such as charging an electric vehicle, delivering power to an inverter that allows the energy to be provided to a utility grid, charging a stationary battery, and the like. The charged stationary battery may be used to transfer its energy to charge an electric vehicle, deliver power to a utility grid, deliver power to a backup power system, and the like. A controller 920 is coupled to combiner box and switching matrix 918 and controls various operations associated with combiner box and switching matrix 918 and with managing the energy flows to or from EV charger 922, inverter 924, and battery 926.

In some embodiments, controller 920 is cloud-based such that actions associated with combiner box and switching matrix 918 can be performed locally or initiated remotely and transmitted to (or from) the controller via a cellular modem connection to the cloud. For example, a remote system 934 may communicate with controller 920 via any type of data communication network 932. Thus, using remote system 934, one or more remote users can manage and control all aspects of a charging session and activities performed by controller 920 via a browser session or other interface via the cloud or from other computing devices, smartphones, and the like.

In some implementations, controller 920 may allow a user to control a vehicle charging session or a battery charging session, including starting and stopping a charger, paying for the service, reviewing the battery state of charge, and the like. Controller 920 can also allow an installer to set up and configure the system, such as configuration parameters for the charger, inverter, or battery. Additionally, controller 920 allows a user to manage a network of chargers, receive data regarding charging sessions, customers, billings, and the like. Further, controller 920 may be used by maintenance personnel to get information regarding problems with a charger, inverter, battery, or other system so they can determine what repairs or maintenance are necessary.

Combiner box and switching matrix 918 distributes DC power to one or more devices, such as an electric vehicle charger 922, an inverter 924, and a stationary battery 926. In some situations, combiner box and switching matrix 918 distributes all available DC power to one of the devices 922-926. In other situations, combiner box and switching matrix 918 may distribute the available DC power to multiple devices 922-926 simultaneously. Although three types of devices 922-926 are illustrated in FIG. 9, combiner box and switching matrix 918 may distribute DC power to other types of devices not shown in FIG. 9.

In some embodiments, electric vehicle charger 922 receives DC power and uses that DC power to charge one or more electric vehicles 928. Inverter 924 may receive DC power and distribute at least a portion of the received DC power to a utility grid (or micro-grid). As shown in FIG. 9, inverter 924 may be coupled to stationary battery 926. Additionally, stationary battery 926 may receive DC power and store the power for future use. The future use may include, for example, charging an electric vehicle 928 through inverter 924, distributing to a utility grid, or distributing to a backup power panel 930. As shown in FIG. 9, electric vehicle 928 can also send power from its battery to electric vehicle charger 922 and stationary battery 926 through switching matrix 918. Further, stationary battery 926 can send power to combiner box and switching matrix 918. For example, electric vehicle 928 may send power to combiner box and switching matrix 918 through electric vehicle charger 922. The combiner box and switching matrix 918 may then send the power from electric vehicle 928 into the utility grid through inverter 924. In some embodiments, electric vehicle 928 may send power to backup power panel 930. In some implementations, electric vehicle 928 is used as a backup battery instead of stationary battery 926.

In some embodiments, the power received by backup power panel 930 is provided to one or more backed up loads. For example, backup power panel 930 may be used to support loads during a utility grid outage. In some implementations, backup power panel 930 may provide power from stationary battery 926 or electric vehicle 928 to power other loads, such as loads in a home, building, or other system needing electrical power in the case of a power outage or power shortage. Example backed up loads include systems used by emergency responders (such as radios and other electrical equipment), military personnel (such as communication equipment, satellite phones, mapping systems, and surveillance systems), and the like. In particular implementations, PV strings 902 and 910 may be connected to backup power panel 930 such that power is provided directly to the backup power panel 930 without passing through stationary battery 926 or other components. In some embodiments, an inverter may be positioned between stationary battery 926 and backup power panel 930.

Figure 10A:
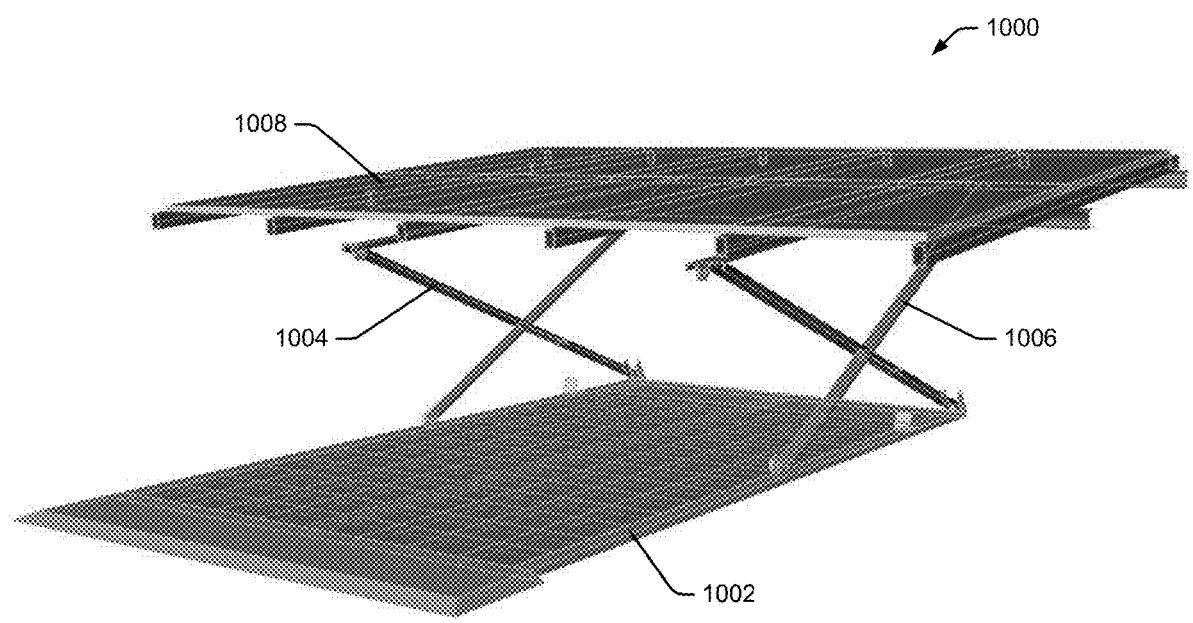

FIGS. 10A-11C depict perspective views of an embodiment of a solar canopy 1000 being moved from a lower height to an upper height (also referred to as an operating height). In FIG. 10A, solar canopy 1000 is at a lower height that allows for easy access to the components of solar canopy 1000 by workers on the ground. In some embodiments, when solar canopy 1000 is in this lower position, the top of solar canopy 1000 may be approximately 4 to 6 feet off the ground. This lower position is useful for workers who are assembling solar canopy 1000, performing maintenance or repairs, and the like. Thus, activities can be performed with respect to solar canopy 1000 without requiring ladders, lifts, cranes, bucket trucks, boom trucks, or other large or heavy equipment typically needed to service solar canopy components farther from the ground.

As shown in FIG. 10A, solar canopy 1000 includes a foundation 1002 (e.g., a ballasted foundation), lifting mechanisms 1004 and 1006, and a table 1008.

Figure 10B:
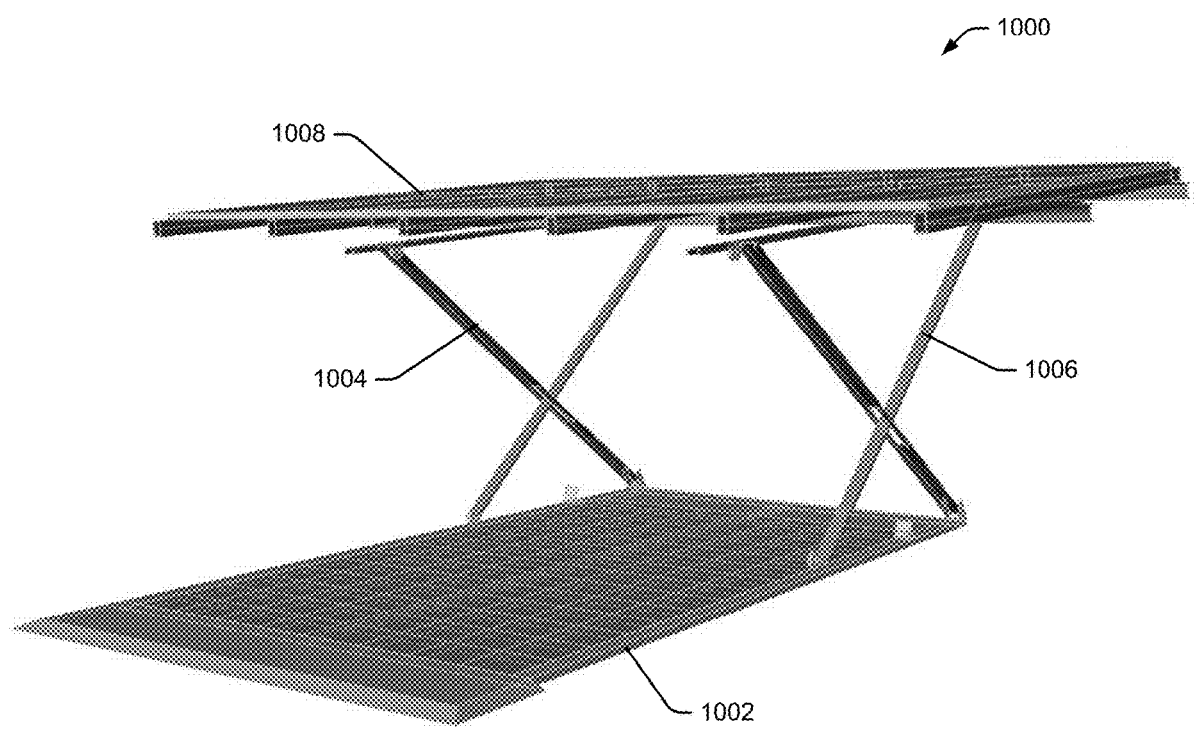

FIG. 10B illustrates solar canopy 1000 with the top (e.g., table 1008) raised farther from the ground than the example of FIG. 10A. In this example, solar canopy 1000 is in between the lower height and the upper height.

Figure 10C:
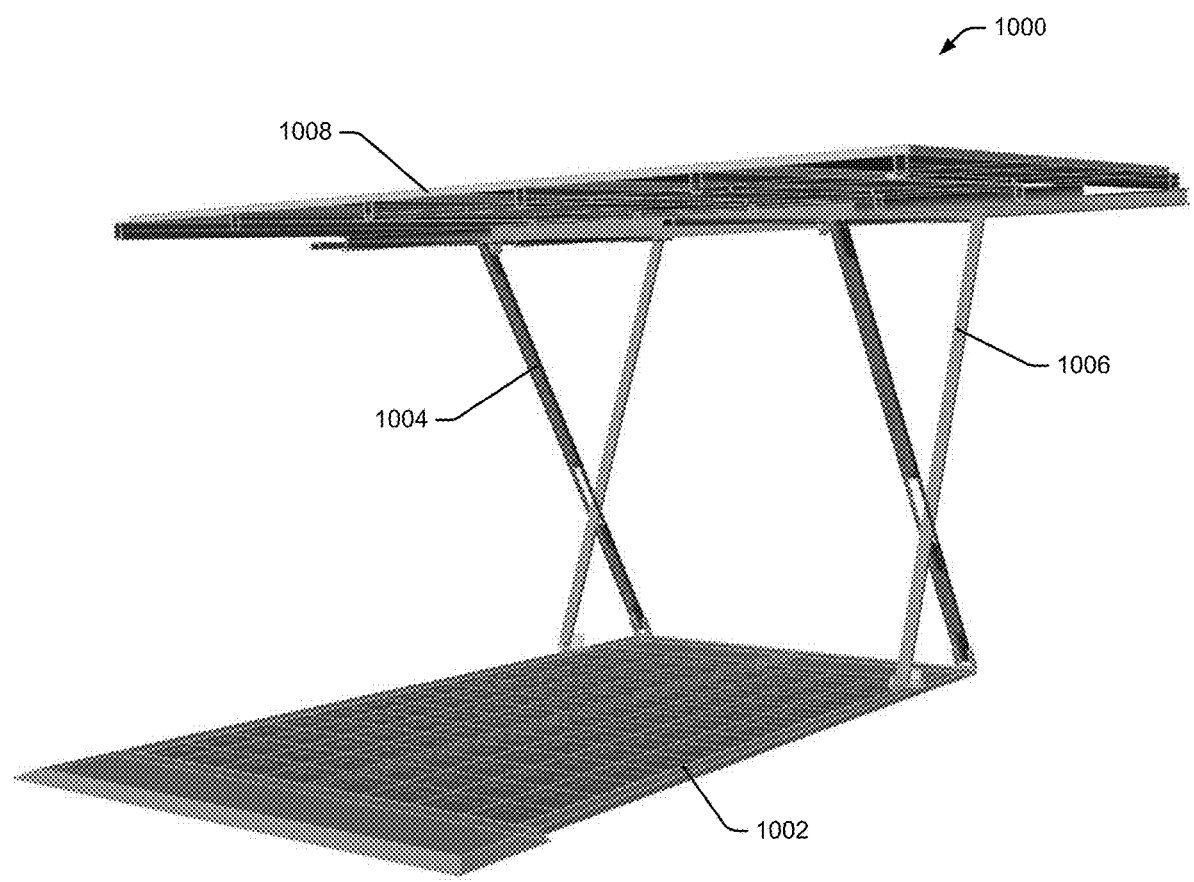

FIG. 10C illustrates solar canopy 1000 at the upper height. This may be the final installed height of solar canopy 1000. At this upper height, a vehicle can drive under the top of solar canopy 1000, thereby receiving shade by the top of the canopy. Additionally, the solar panels on the top of solar canopy 1000 may provide electricity to charge an electric vehicle parked under (or nearby) solar canopy 1000 or to provide electricity to an inverter or a stationary battery.

In some embodiments, workers can assemble solar canopy 1000 at the lower height where the canopy is easily accessible from the ground, then raise the top of the canopy to the upper height for normal operation. If maintenance, repairs, or disassembly are needed, workers can lower solar canopy 1000 to the lower height for easy access while standing on the ground.

In some implementations, the top of solar canopy 1000 may be tilted relative to the ground surface (and relative to foundation 1002). This tilt of the top of solar canopy 1000 may cause the solar panels to be angled toward the received sunlight such that the solar panels receive more sunlight and produce more electricity. For example, the top of solar canopy 1000 may be tilted to be substantially south-facing (in the northern hemisphere) to capture more sunlight.

In some embodiments, the top of solar canopy 1000 can be tilted such that the top tilts toward the front of solar canopy 1000 (e.g., the front being a vehicle access point). In other embodiments, the top of solar canopy 1000 may be tilted toward the back of solar canopy (e.g., the back being the area where lift mechanisms 1004 and 1006 are mounted to the ballasted foundation 102). The tilt of the top of solar canopy 1000 can be adjusted based on the installation location and the best angle to maximize the generation of electricity from the sunlight incident on the solar panels. In some embodiments, the tilt of the top of solar canopy 1000 can be changed by reversing the positions of lift supports 1004 and 1006 (e.g., installing 1004 where 1006 is shown in FIG. 10A and installing 1006 where 1004 is shown in FIG. 10A).

Figure 11A:
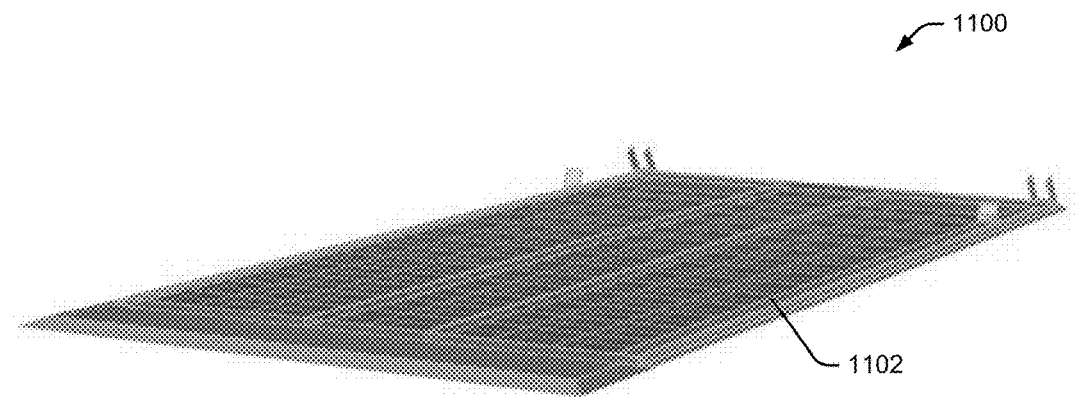
Figure 11B:
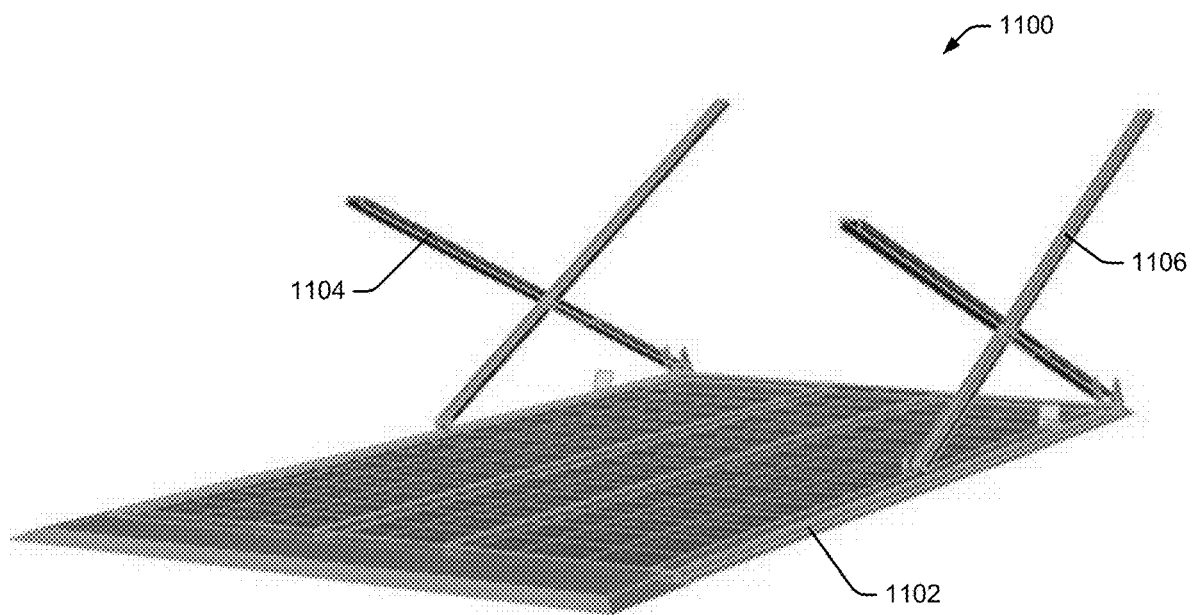

FIGS. 11A-11H depict perspective views of an embodiment of a solar canopy 1100 being assembled. FIG. 11A illustrates solar canopy 1100 being assembled by starting with the foundation 1102. FIG. 11B illustrates solar canopy 1100 being assembled by adding lifting mechanisms 1104 and 1106.

Figure 11C:
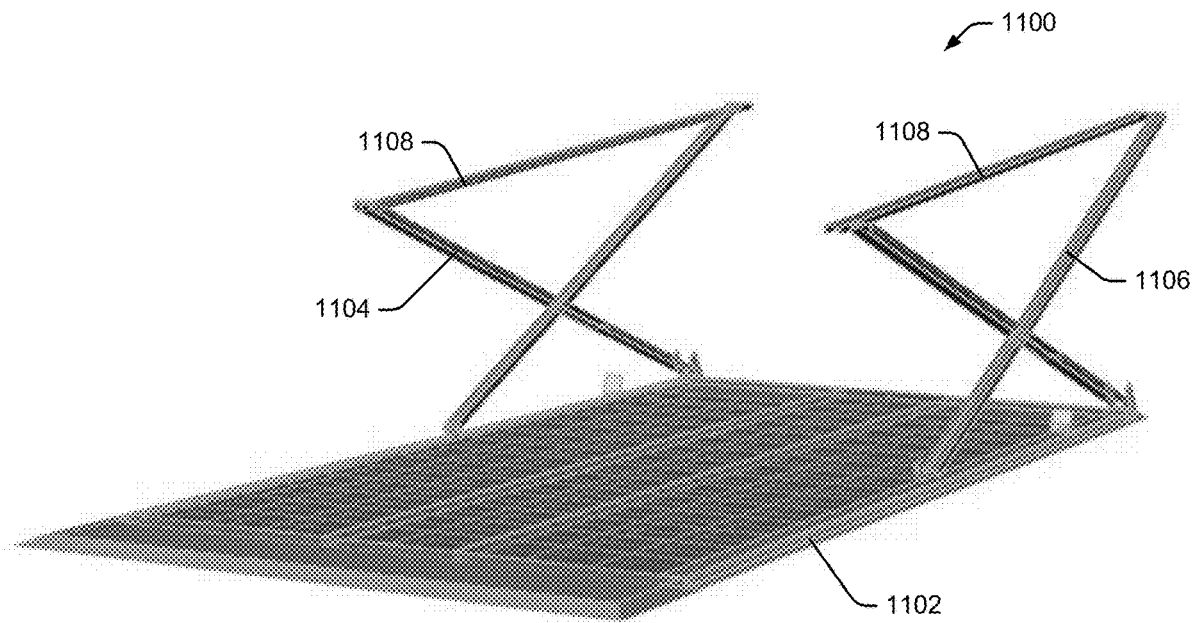
Figure 11D:
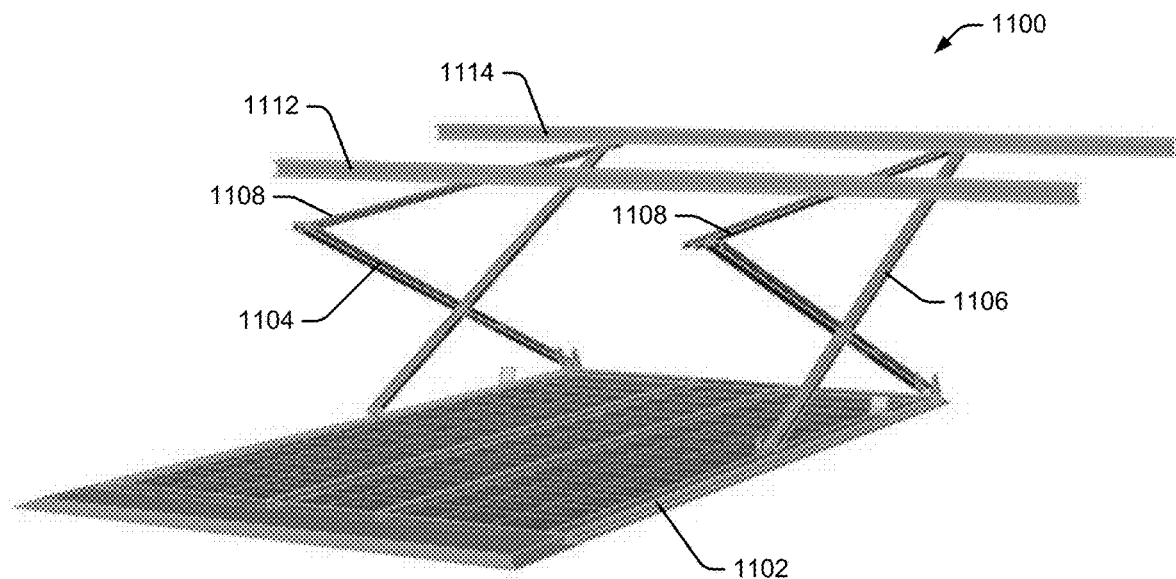
Figure 11E:
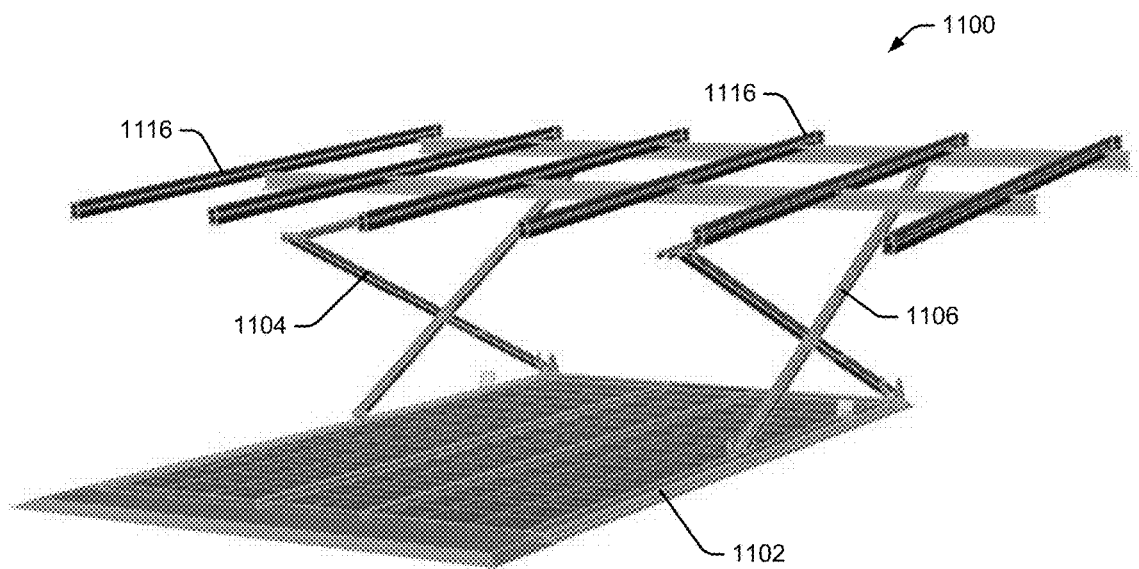
Figure 11F:
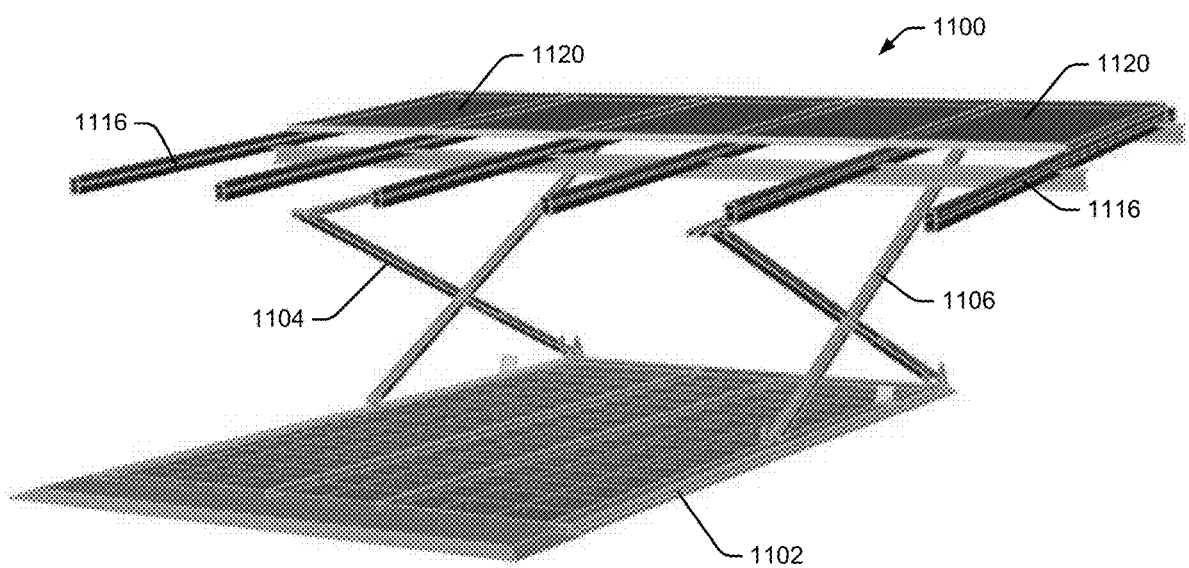
Figure 11G:
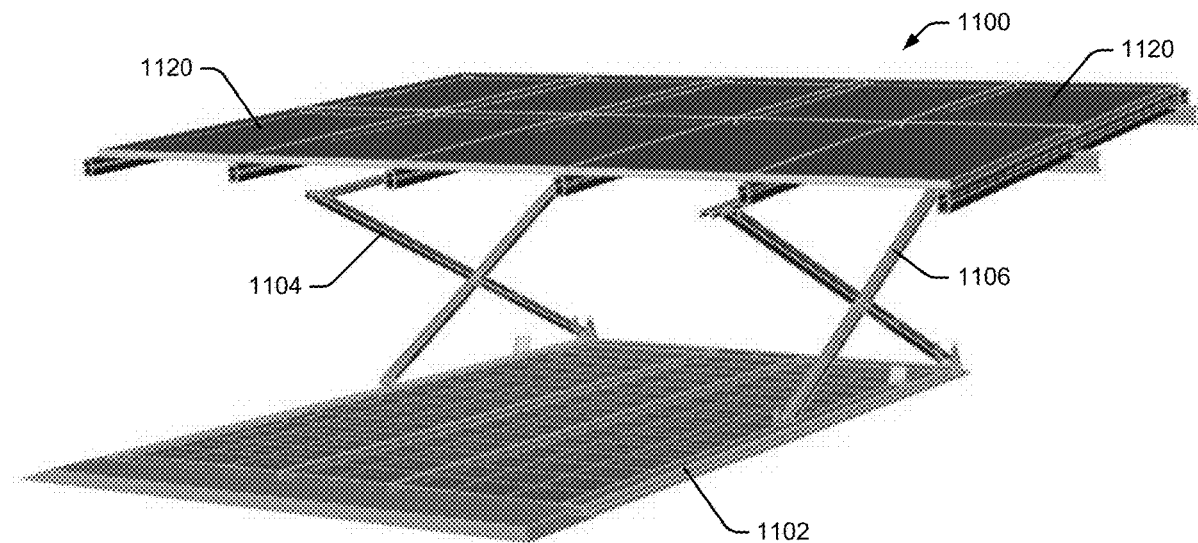

FIG. 11C illustrates the assembly of solar canopy 1100 by adding a portion of table 1108. FIGS. 11D and 11E illustrate the assembly of solar canopy 1100 by adding additional support structures 1112, 1114, and 1116 associated with table 1108. FIGS. 11F and 11G illustrate the assembly of solar canopy 1100 by adding solar panels 1120 to the support structure provided by table 1108. For example, FIG. 11F illustrates the installation of five solar panels 1120 and FIG. 11G illustrates the installation of 10 solar panels 1120.

Figure 11H:
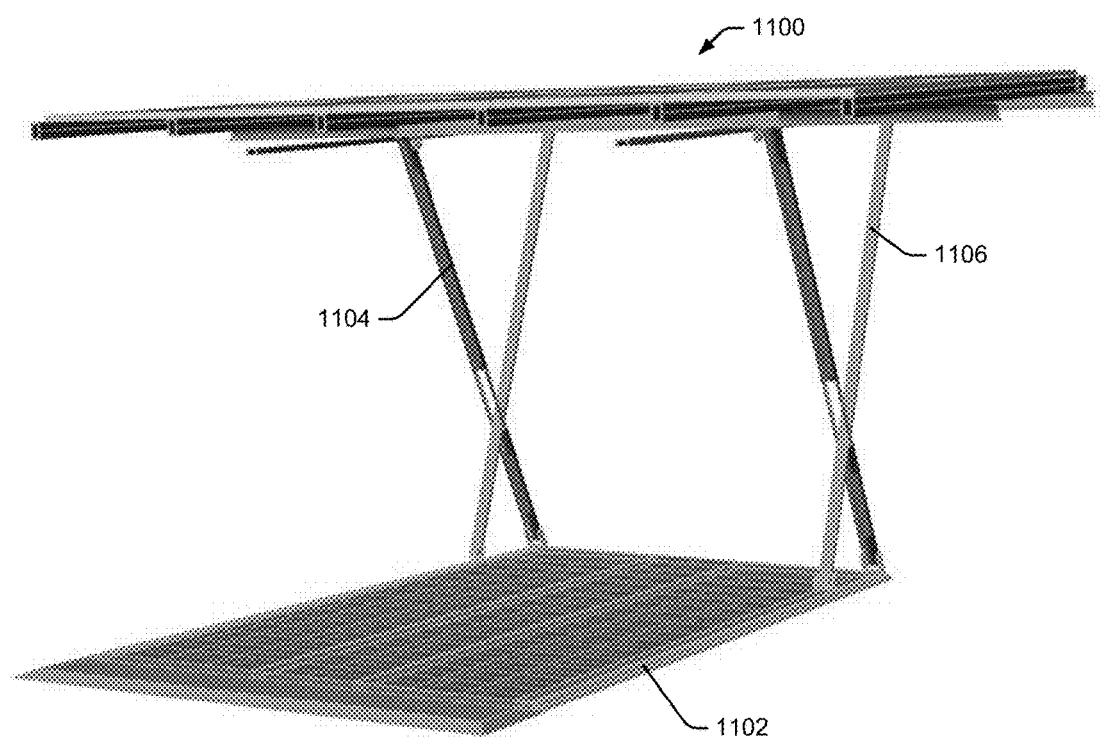

The assembly steps shown in FIGS. 11A-11G are performed with solar canopy 1100 at the lower height such that one or two people can assemble solar canopy 1100 while standing on the ground. FIG. 11H illustrates solar canopy 1100 after being raised to the upper height for normal operation.

Figure 12:
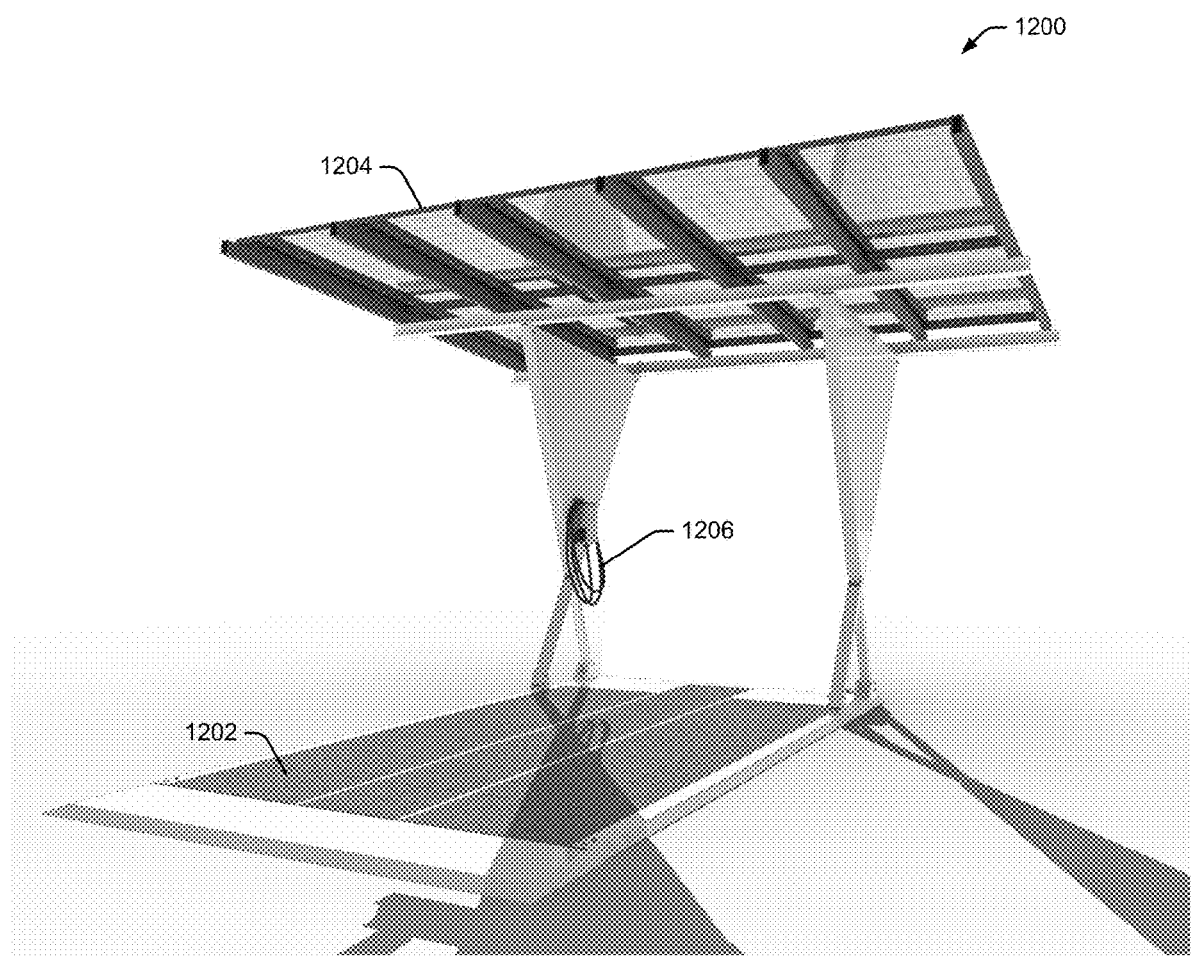
FIG. 12 depicts a perspective view of an embodiment of a solar canopy with a charging cable suitable for connection to an electric vehicle.

FIG. 12 depicts a perspective view of an embodiment of a solar canopy 1200 with a charging cable 1206 suitable for connection to an electric vehicle or other device (not shown). Thus, solar canopy 1200 allows an electric vehicle to drive under the table 1204 of solar canopy 1200, while driving on a foundation 1202. The electrical vehicle can be connected to charging cable 1206 such that the electric vehicle may be charged using electricity generated by the solar panels associated with solar canopy 1200.

Figure 13:
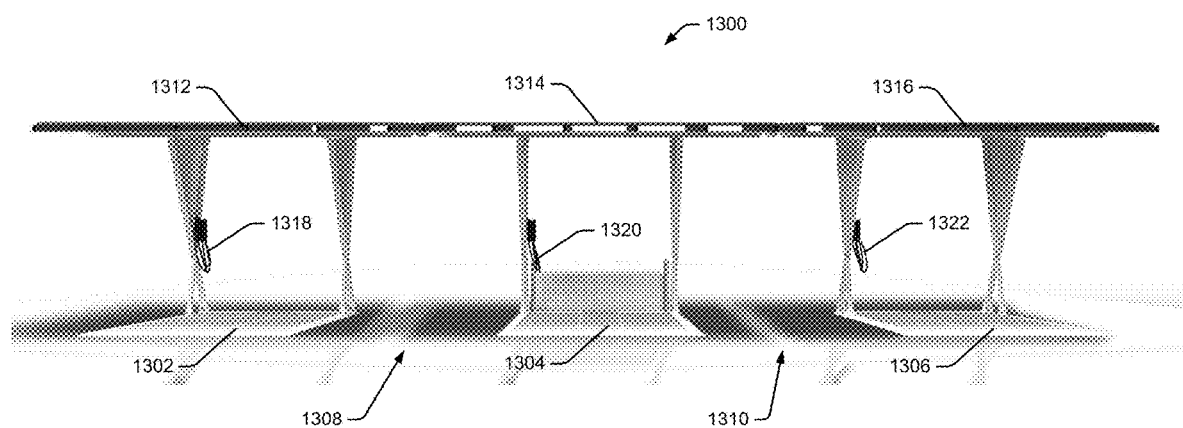
FIG. 13 depicts a front view of an example configuration that includes multiple solar canopies adjacent to one another.

FIG. 13 depicts a front view of an example configuration 1300 that includes multiple solar canopies adjacent to one another. As shown in FIG. 13, three individual solar canopies 1312, 1314, and 1316 are positioned adjacent to one another. In this example, the top of each individual solar canopy is wider than the corresponding foundations 1302, 1304, and 1306 such that the top of each solar canopy extends beyond the sides of its foundation. Thus, when three individual solar canopies 1312, 1314, and 1316 are positioned adjacent to one another (such that the edges of the tops of adjacent solar canopies are close to one another), two additional parking spaces are created in the gaps between adjacent solar canopies (e.g., the gaps 1308 and 1310). In the example of FIG. 13, each solar canopy 1312, 1314, and 1316 includes a charging cable 1318, 1320, and 1322 for charging an electric vehicle or other device.

The example of FIG. 13 provides five fully covered parking spaces. Further, there are two additional "partially covered" parking spaces at the left and right end of configuration 1300. These two additional "partially covered" parking spaces provide some shade to a vehicle, but not as much as a fully covered parking space.

In some embodiments, each canopy may include 10×500 W solar panels, for a nominal capacity of 5 kW. Combining these three canopies would provide up to a 15 kW charging source. The capacity of the batteries can be matched in a way that assures that the battery is big enough not to be exhausted when it's charging a vehicle but also not so big that it's too expensive or too physically large. In this example, a size of 24 to 80 kWh may be used for the battery. The combination of these two resources (solar panels and battery) needs to be large enough to charge a vehicle. As an example, a 15 kW solar array in a sunny location like California using bifacial panels should generate approximately 55 to 95 kWh per day (if the weather is reasonably sunny). The system is designed to avoid completely exhausting the stationary battery and, instead, the stationary battery is used as a buffer. So, a 40 kWh battery may have an approximate usable capacity of 36 kWh. If a car with a 60 kWh battery wants to charge its battery and is fully depleted upon arrival, then it may need 60 kWh. If the stationary battery starts full with 36 kWh of available capacity and there's 55 kWh of available solar power throughout the day, that's a total of 91 kWh. If the system delivers 60 kWh of that to the vehicle, the system will only have reduced the capacity of the stationary battery from 36 kWh to 31 kWh (of the 60 kWh delivered to the electric vehicle, 55 kWh of it came from the solar panels and 5 kWh of it came from the stationary battery). So, the system still has a good reserve in the stationary battery for the next day or the next vehicle. The described systems and methods are able to manage the various power flows (solar, battery, and electric vehicle) to assure that they all stay in good operating condition and give customers a good experience in terms of their EV charging expectations vs. the energy delivered by the system.

Figure 14:
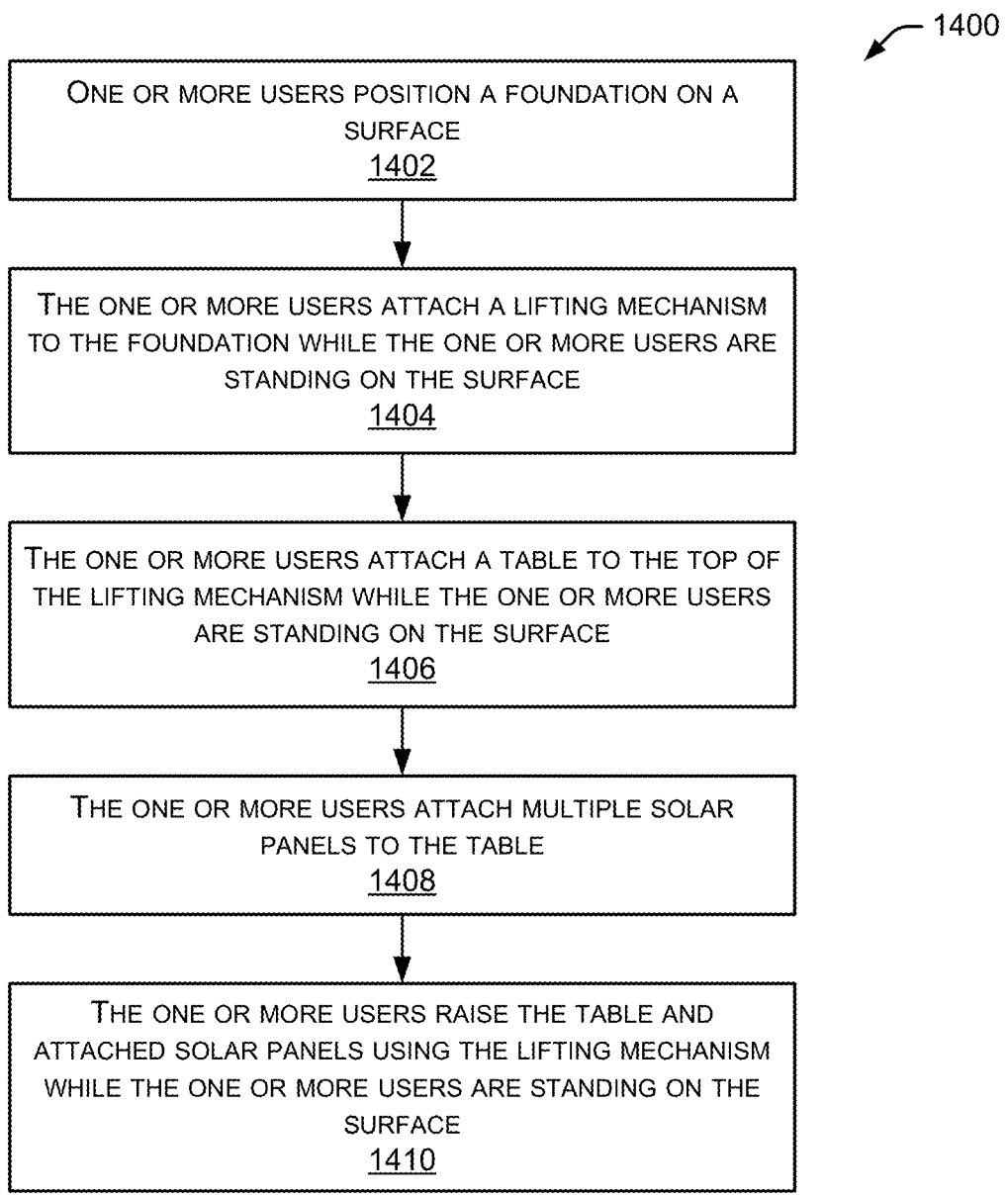
FIG. 14 is a flow diagram depicting an embodiment of a method for assembling a solar canopy.

FIG. 14 is a flow diagram depicting an embodiment of a method 1400 for assembling a solar canopy. Initially, one or more users position 1402 a foundation on a surface. The users then attach 1404 a lifting mechanism to the foundation while the users are standing on the surface. The method continues as the users attach 1406 a table to the top of the lifting mechanism while the users are standing on the surface. The users then attach 1408 multiple solar panels to the table. Finally, the users raise 1410 the table and attached solar panels using the lifting mechanism. This operation of raising 1410 the table is performed while the users are standing on the surface.

Figure 15:
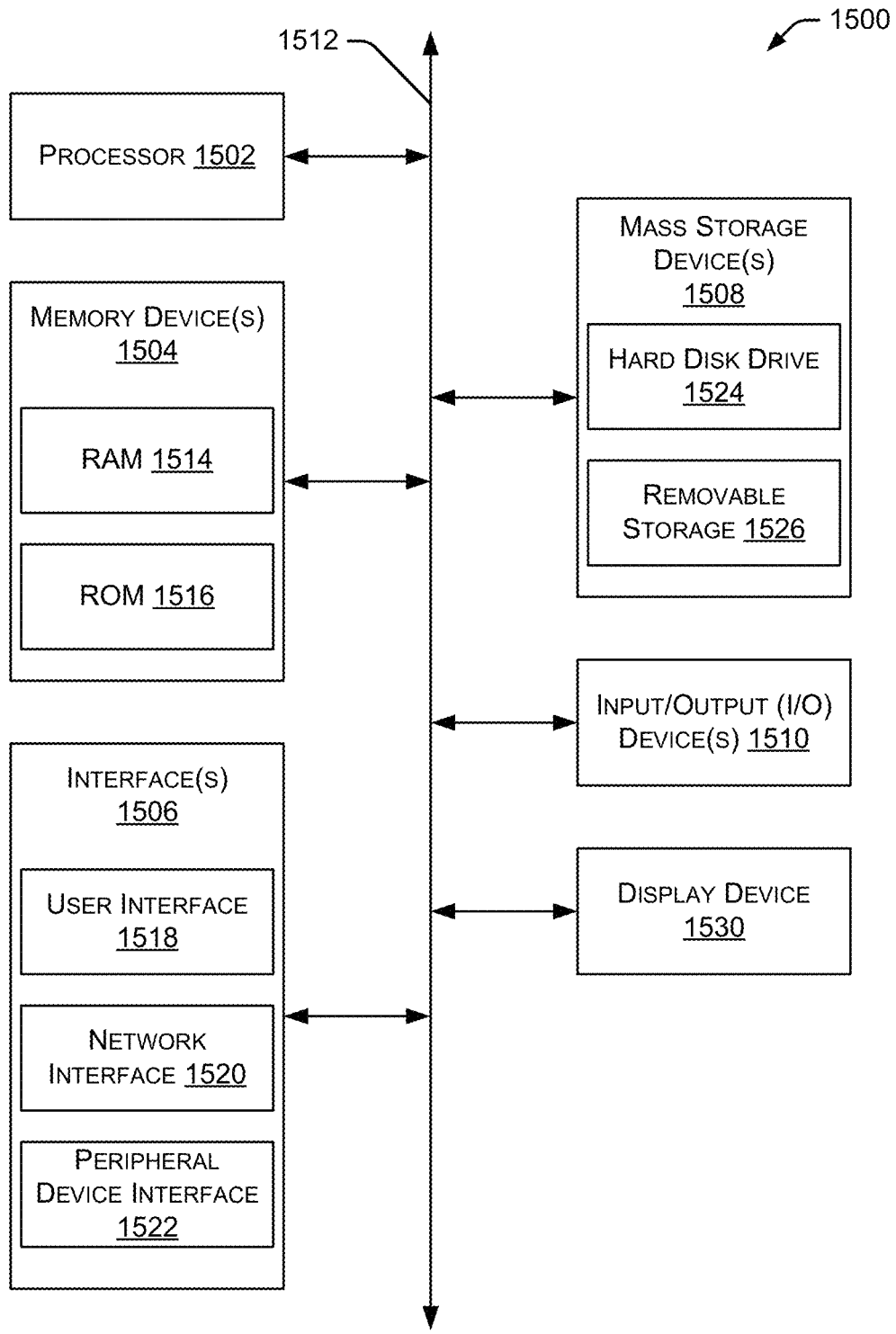
FIG. 15 depicts a block diagram of an embodiment of a computing device.

FIG. 15 illustrates an example block diagram of a computing device 1500. Computing device 1500 may be used to perform various procedures, such as those discussed herein. Computing device 1500 can execute one or more application programs, such as the application programs or functionality described herein. Computing device 1500 can be any of a wide variety of computing devices, such as a desktop computer, a notebook computer, a server computer, a handheld computer, tablet computer, a wearable device, and the like.

Computing device 1500 includes one or more processor(s) 1502, one or more memory device(s) 1504, one or more interface(s) 1506, one or more mass storage device(s) 1508, one or more Input/Output (I/O) device(s) 1510, and a display device 1530 all of which are coupled to a bus 1512. Processor(s) 1502 include one or more processors or controllers that execute instructions stored in memory device(s) 1504 and/or mass storage device(s) 1508. Processor(s) 1502 may also include various types of computer-readable media, such as cache memory.

Memory device(s) 1504 include various computer-readable media, such as volatile memory (e.g., random access memory (RAM) 1514) and/or nonvolatile memory (e.g., read-only memory (ROM) 1516). Memory device(s) 1504 may also include rewritable ROM, such as Flash memory.

Mass storage device(s) 1508 include various computer readable media, such as magnetic tapes, magnetic disks, optical disks, solid-state memory (e.g., Flash memory), and so forth. As shown in FIG. 15, a particular mass storage device is a hard disk drive 1524. Various drives may also be included in mass storage device(s) 1508 to enable reading from and/or writing to the various computer readable media. Mass storage device(s) 1508 include removable media 1526 and/or non-removable media.

I/O device(s) 1510 include various devices that allow data and/or other information to be input to or retrieved from computing device 1500. Example I/O device(s) 1510 include cursor control devices, keyboards, keypads, microphones, monitors or other display devices, speakers, printers, network interface cards, modems, and the like.

Display device 1530 includes any type of device capable of displaying information to one or more users of computing device 1500. Examples of display device 1530 include a smartphone, an external PC, a monitor, display terminal, video projection device, and the like.

Interface(s) 1506 include various interfaces that allow computing device 1500 to interact with other systems, devices, or computing environments. Example interface(s) 1506 may include any number of different network interfaces 1520, such as interfaces to local area networks (LANs), wide area networks (WANs), wireless networks, cellular modem networks, and the Internet. Interface(s) 1506 may further include an external smartphone (or other portable computing device) that uses a browser as an interface to cloud-based computing systems, controller 320, and the like. Other interface(s) include user interface 1518 and peripheral device interface 1522. The interface(s) 1506 may also include one or more user interface elements 1518. The interface(s) 1506 may also include one or more peripheral interfaces such as interfaces for printers, pointing devices (mice, track pad, or any suitable user interface now known to those of ordinary skill in the field, or later discovered), keyboards, and the like.

Bus 1512 allows processor(s) 1502, memory device(s) 1504, interface(s) 1506, mass storage device(s) 1508, and I/O device(s) 1510 to communicate with one another, as well as other devices or components coupled to bus 1512. Bus 1512 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1500, and are executed by processor(s) 1502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   positioning a foundation on a surface by at least one user at an installation site, wherein the foundation is a unitary structure;
   attaching a lifting mechanism to the foundation by at least one user standing on the surface at the installation site;
   attaching a table to the top of the lifting mechanism by at least one user standing on the surface at the installation site, wherein the table includes a plurality of edges;
   attaching a plurality of solar panels to the table at the installation site; and
   raising, by at least one user standing on the surface, the table and the attached solar panels from a lowered position to a raised position using the lifting mechanism, wherein raising the table from the lowered position to the raised position moves all of the plurality of edges.

2. The method of claim 1, wherein the surface is at least one of a substantially planar ground surface, an irregular ground surface, a paved surface, a dirt surface, an unimproved surface, or liquid surface.

3. The method of claim 1, wherein the foundation is at least one of a ballasted foundation, a foundation mounted to the surface, or a free-standing foundation.

4. The method of claim 1, further comprising adjusting an angle of the table based on a location of the foundation and an angle of maximum light incident on the plurality of solar panels.

5. The method of claim 1, further comprising coupling a control system to the plurality of solar panels.

\* \* \* \* \*